April 22, 1969 A. F. THORNHILL 3,440,535
PHASE LOCKED LOOP SERVO SYSTEM FOR DIRECT
MEASUREMENT OF RELATIVE PHASE
Filed July 28, 1966

INVENTOR
*ALEXANDER F. THORNHILL*

BY

ATTORNEY

United States Patent Office 3,440,535
Patented Apr. 22, 1969

3,440,535
PHASE LOCKED LOOP SERVO SYSTEM FOR DIRECT MEASUREMENT OF RELATIVE PHASE
Alexander F. Thornhill, Accokeek, Md., assignor to the United States of America as represented by the Secretary of the Navy
Filed July 28, 1966, Ser. No. 569,007
Int. Cl. G01r 25/04
U.S. Cl. 324—83                   4 Claims

ABSTRACT OF THE DISCLOSURE

A phase measuring system having a first mode, for use in circular radio navigation systems, and a second mode, for use in hyperbolic radio navigation systems, comprising three phase locked loops each including a phase detector, a servo, a phase shifter and a readout device. In the first mode all three loops are referenced to a frequency standard. In the second mode two of the loops are referenced to the third to give a direct readout of relative phase.

---

The invention described herein may be manufactured and used by or for the Government of the United States of America for governmental purposes without the payment of any royalties thereon or therefor.

The present invention relates to a phase difference measuring system and more particularly to a phase difference measuring servo system which is capable of being converted for use with either circular radio navigation systems or with hyperbolic radio navigation systems and wherein the measurement of phase differences is accomplished with fewer parts and at less expense than similar prior art systems.

In the field of long-range radio navigation systems which operate by the measurement of the phase differences between signals from pairs of stations, such as the Omega system, it has been the general practice to employ phase difference measuring systems which obtain the differences of phase of two pairs of signals by means of phase shifters and differentials which in turn are connected to read-outs which provide visual representations of the differences in phase of the pairs of signals. Although such devices serve the purpose, they have not proved entirely satisfactory under all conditions of service for the reasons that these devices require a great degree of mechanical complexity, and as a result require more space for their operation than is desirable and which additionally results in the increased weight and cost of such devices. The use of long-range radio navigation systems, such as Omega, in light aircraft and in submarines requires the use of equipment which is light weight and which requires little operating space.

Therefore, the general purpose of this invention is to provide a phase difference measuring servo system which embraces all of the advantages of similarly employed phase difference measuring systems and possesses none of the aforedecribed disadvantages. To obtain this the present invention contemplates a unique arrangement of phase shifters and readouts whereby the use of complex mechanical differentials is eliminated and whereby the rapid conversion can be made between circular radio navigation systems and hyperbolic radio navigation systems.

Another important purpose of this invention is to provide such a phase difference measuring system which obtains the same result as achieved by similar prior art systems but with a fewer number of components. While this invention accomplishes with fewer components the same results as are obtained by prior art systems, the invention additionally provides the advantages of being a device which is lighter in weight and less bulky in size than similar prior art devices while providing the additional feature of convertibility from circular to hyperbolic coordinates.

An object of the present invention is the provision of a light weight phase difference measuring servo system.

Another object is to provide such a system which is easily convertible for use with either circular radio navigation systems or with hyperbolic radio navigation systems.

A further object of the invention is the provision of such a phase difference measuring system which attains the same result with a fewer number of components essential in similar prior art systems while producing no adverse effects as a result of the new arrangement.

With these and other objects in view, as will hereinafter more fully appear, and which will be more particularly pointed out in the appended claims, reference is now made to the following description taken in connection with the accompanying drawings in which:

Figure 1:
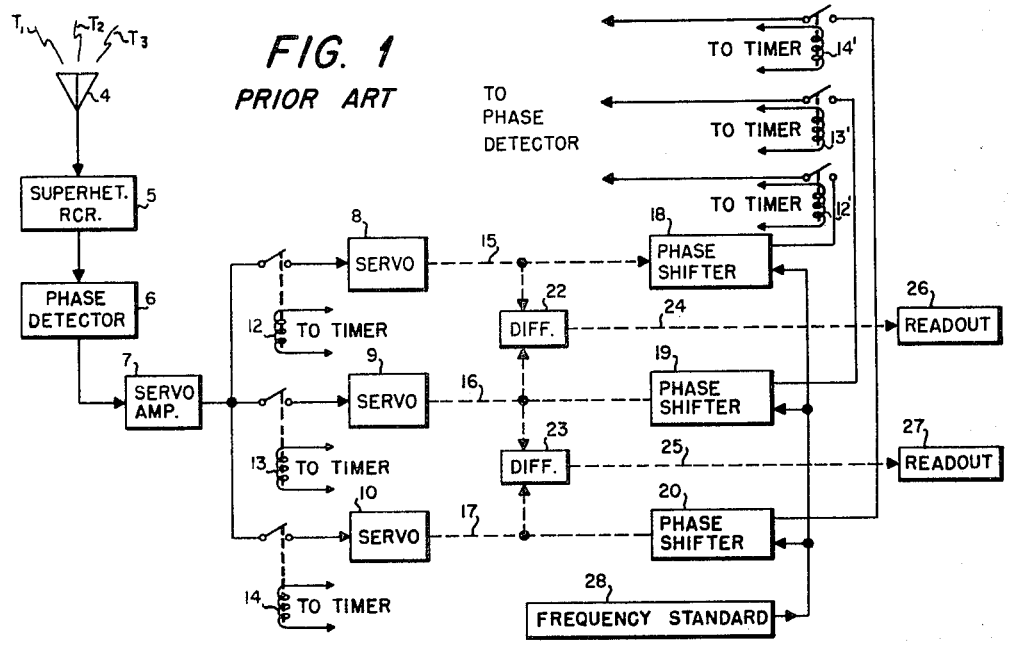
FIG. 1 shows a block diagram of a phase difference measuring servo system which is known in the art.

Referring now to the drawings, wherein like reference characters designate like or corresponding parts throughout the several views, there is shown in FIG. 1, which illustrates a prior art system, an antenna 4 which is coupled to a superheterodyne receiver 5. Receiver 5, in turn, is connected to a phase detector 6 the output of which is coupled to the input of servo amplifier 7. The output of servo amplifier 7 is then coupled to the inputs of servos 8, 9, and 10 through relays 12, 13, and 14, respectively, wherein each of the relay inputs is coupled to a timer (not shown) which controls the activation and deactivation of the relays 12, 13, and 14.

Each of the servos 8, 9, and 10 has a mechanical output 15, 16, and 17, respectively, which is mechanically coupled to the inputs of phase shifters 18, 19, and 20, respectively. In addition, the mechanical outputs 15 and 16 of servos 8 and 9, respectively, are mechanically coupled to differential 22, the mechanical output of which is, in turn, connected to the input of readout 26. Similarly, the mechanical outputs 16 and 17 of servos 9 and 10, respectively, are mechanically coupled to differential 23 the output 25 of which is coupled to the input of readout 27.

In addition to the mechanical inputs to the phase shifters 18, 19, and 20 there is provided an electrical input from a frequency standard 28. Each of the phase shifters 18, 19, and 20, in turn, has an electrical output which is coupled through relays 12', 13', and 14', respectively, to phase detector 6. Here again, each of the relays 12', 13', and 14' are activated or deactivated by a timer (not shown) which is coupled to the relays in the same manner as with respect to relays 12, 13, and 14.

Figure 2:
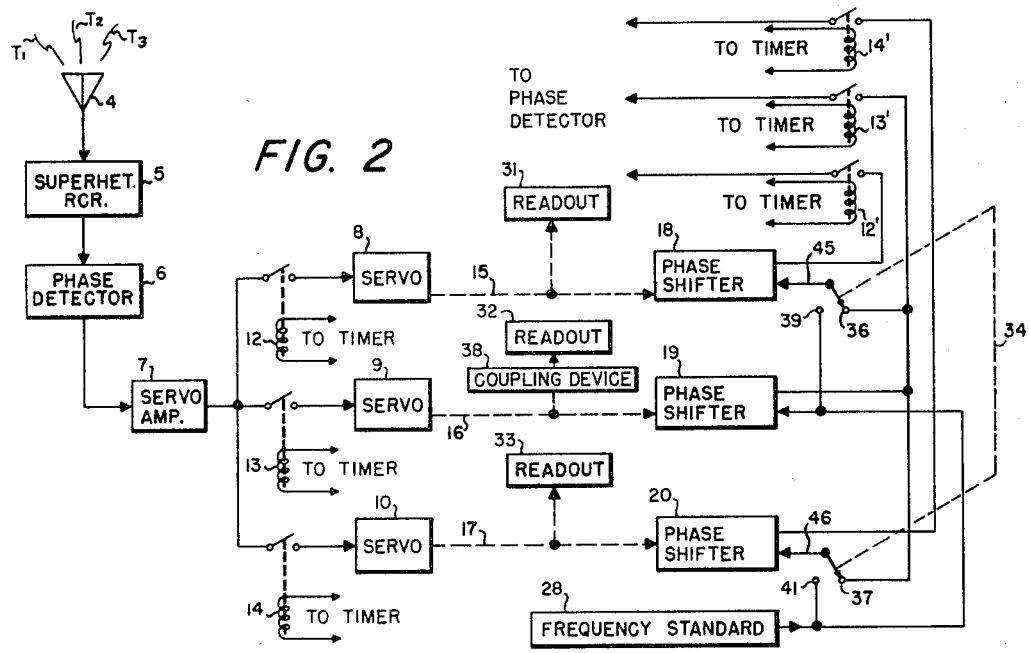
FIG. 2 illustrates a block diagram of a preferred embodiment of this invention.

FIG. 2 illustrates a preferred embodiment of the invention wherein there is shown an antenna 4 which is coupled to phase detector 6 through superheterodyne receiver 5. The output of phase detector 6, in turn, is coupled to the input of servo amplifier 7, the output of which is connected to the inputs of servos 8, 9, and 10 through relays 12, 13, and 14, respectively. Each of the relays is connected to a timer (not shown) which controls their operation. Each of the servos 8, 9, and 10 has a mechanical output 15, 16, and 17, respectively, which is mechanically coupled to the inputs of phase shifters 18, 19, and 20, respectively.

Each of the mechanical outputs 15 and 17 is, in turn, mechanically coupled to readouts 31 and 33, respectively, while the mechanical output 16 is mechanically coupled to readout 32 through the coupling device 38, which may be a clutch or the like. The phase shifter 19 has, in addition to the mechanical input 16, an electrical input from frequency standard 28; and phase shifters 18 and 20 are also provided with electrical inputs 45 and 46, respectively, the sources of which are controlled by switch 34 and by the position of switch 34 with respect to contacts 36 and 37 or with respect to contacts 39 and 41. As shown in FIG. 2 the switch 34 is closing contacts 36 and 37, both of which are electrically coupled to the output of phase shifter 19 in such a way as to permit the output of phase shifter 19 to act as the electrical input to phase shifters 18 and 20, respectively. Each of the phase shifters 18, 19, and 20 are provided with electrical outputs which are electrically coupled to phase detector 6 through relays 12', 13', and 14', respectively, which relays, in a manner similar to relays 12, 13, and 14, are controlled by a timer (not shown) that is coupled to the inputs of each of the relays 12', 13', and 14'.

In the operation of the prior art phase difference measuring servo system of FIG. 1 which is to be used in hyperbolic radio navigation systems, when a signal such as $T_1$ is received by the antenna 4, the phase of which is being tracked by servo 8, relay 12 is closed by the action of the timer (not shown) which is synchronized with the transmission of signal $T_1$, and the closing of relay 12 enables servo 8 to be energized by the signal $T_1$ so as to turn the associated shaft 15 of phase shifter 18. The electrical output of the phase shifter 18 is then returned to the phase detector 6 because the relay 12' is coupled to the timer (not shown) in the same manner as is relay 12 so that relay 12 and relay 12' are closed and opened simultaneously and in sequence with the transmission of signal $T_1$.

The electrical output of phase shifter 18 which is returned to phase detector 6 is then compared with the incoming signal $T_1$ and any difference in phase is then amplified by servo amplifier 7 so as to turn the shaft 15 of phase shifter 18 further. This process continues until the output of phase shifter 18 has the same phase as the incoming signal $T_1$, at which time the output of phase detector 6 becomes zero, and servo 8 stops. This process is repeated in turn by each of the servos and phase shifters with the result that the electrical outputs of the phase shifters have the same phases as the associated radio signals $T_1$, $T_2$, and $T_3$, and the shaft angles of the phase shifters represent the differences in phase between the frequency standard 28 and the radio signals $T_1$, $T_2$, and $T_3$. The differentials 22 and 23 which are connected between the shafts of pairs of phase shifters 18–19, and 19–20, respectively, measure the differences in shaft rotation of the phase shifters and, in turn, display these differences on readout devices 26 and 27, respectively. Because the frequency standard is common to all three phase measurements as made by phase shifters 18, 19, and 20, its influence disappears from the differences taken by the differentials, and the readouts 26 and 27 show directly the desired phase differences between radio signals $T_1$ and $T_2$ and between the radio signals $T_2$ and $T_3$, respectively.

The system shown in FIG. 2 is a phase tracking servo system which is simpler and more flexible than prior art systems such as shown in FIG. 1; but the signal paths from the phase detector 6 through the relays, servos and phase detectors, and back to the phase detector 6 are essentially the same as described in relationship to FIG. 1. The connections of the phase shifters 18, 19, and 20, and of the readouts are different, however, and the differentials 22 and 23 which are required in the operation of the prior art system shown in FIG. 1 have been eliminated.

In the operation of the system shown in FIG. 2 relays 12 and 12' which are controlled by the timer (not shown) are closed during the transmission time of a signal such as $T_1$, and the phase of the signal $T_1$ is tracked by servo 8 which turns the associated shaft 15 of phase shifter 18. The electrical output of phase shifter 18 is returned to the phase detector 6 where it is compared with the incoming signal $T_1$ and any difference in phase is then amplified by the servo amplifier 7 so as to turn the shaft 15 of phase shifter 18 further. This process continues until the electrical output of phase shifter 18 has the same phase as the incoming signal $T_1$, at which time the output of the phase detector 6 becomes zero and servo 8 stops.

This process is repeated, in turn, by each of the servos and phase shifters; however, with the position of switch 34, as shown, phase shifters 18 and 20 receive the electrical output of center phase shifter 19 as inputs. The result of this arrangement is that the shaft angles of the phase shifters 18 and 20 represent directly the differences in phase of the pairs of radio signals $T_1$–$T_2$ and $T_2$–$T_3$, so the readouts 41 and 43, which are directly connected to the mechanical shafts 15 and 17, display directly the phase differences between radio signals $T_1$–$T_2$ and $T_2$–$T_3$ without the need for intervening differentials 22 and 23 as required in the system of FIG. 1. In other words, phase shifters 18 and 20 now perform the functions of the differentials as well as their usual function.

The system of FIG. 2 as shown with switch 34 contacting terminals 36 and 37 represents a use of this system in hyperbolic radio navigation systems wherein it is desired to measure the difference in phase between two pairs of signals, e.g., $T_1$–$T_2$ and $T_2$–$T_3$. But in addition to being simpler than similar prior art systems the system of this invention is also more flexible because it can be converted to one which measures the phases of each of the radio signals $T_1$, $T_2$, and $T_3$ individually relative to the frequency standard 28. This feature of convertibility enables this system to be used not only with hyperbolic systems, but when switch 34 is in a position so as to close contacts 39 and 41 the system is then capable of operation in circular radio navigation systems.

By throwing switch 34 so as to close contacts 39 and 41, thus opening contacts 36 and 37, the output of frequency standard 28 is supplied as an electrical input to all of the phase shifters 18, 19 and 20, and the readouts 31 and 33 then read the individual phase differences between radio signal $T_1$ and the frequency standard and between radio signal $T_3$ and the frequency standard. Should it be desirable that all three phases be available, e.g., that the phase of radio signal $T_2$ be known also, the center readout 32 can be mechanically engaged through the shaft 16 by coupling device 38. In this way the phase differences between each of the radio signals $T_1$, $T_2$, and $T_3$ and the frequency standard 28 are obtained and displayed by readouts 31, 32, and 33, respectively. It can be seen from a comparison of the prior are system shown in FIG. 1 and the system of this invention shown in FIG. 2 that in order to obtain the same flexibility the prior art system in FIG. 1 would require much greater mechanical complexity and three more readout devices.

It can be seen that this invention provides for a unique phase difference measuring servo system which accomplishes the same objectives as similar prior art systems while accomplishing this with a lesser number of components essential in such prior art systems. However, the system of this invention accomplishes these objectives without incurring any adverse effects as a result of the new arrangement. In addition, the phase difference measuring system of this invention is simpler and more flexible than prior art systems and is capable of being converted for use in either hyperbolic radio navigation systems or in circular radio navigation systems.

Obviously many modifications and variations of the present invention are possible in light of the above teachings. For example, although the invention has been described with respect to electromechanical servo systems it should be understood that the scope of this invention is not limited to this type of servo system and could be used as well with all electronic systems. It is therefore to be understood that within the scope of the appended claims the invention may be practiced otherwise than as specifically described.

What is claimed and desired to be secured by Letters Patent of the United States is:

1. A phase difference measuring servo system for use in circular and hyperbolic radio navigation systems comprising:
   a phase detector;
   at least three sequentially activated servo devices operatively associated with said phase detector;
   at least first, second and third phase shifters coupled one each to said servo devices;
   means providing a frequency standard coupled to said first phase shifter;
   switching means operatively associated with said second and third phase shifters to enable the alternate coupling of said second and third phase shifters to said frequency standard and to said first phase shifter, thereby providing hyperbolic navigation; and
   at least three readout devices coupling one each to said phase shifters to display the desired phase information.

2. A phase measuring servo system for use in circular and hyperbolic radio navigation systems having at least three stations for transmitting first, second and third signals, respectively, comprising:
   a phase detector;
   at least three servo devices operatively associated with said phase detector, each having a mechanical output member;
   means for sequentially activating said servo devices;
   at least first, second and third phase shifters each having an electrical input terminal, an electrical output terminal operatively coupled to said phase detector, and a mechanical input terminal coupled to one of the mechanical output members of said servo devices;
   means providing a frequency standard signal coupled to the electrical input terminal of said first phase shifter;
   two-position switching means operatively associated with said second and third phase shifters to couple the electrical input terminals of both said second and third phase shifters to said frequency standard when said switching means is in a first position, and to the electrical output terminal of said first phase shifter when said switching means is in a second position; and
   at least three readout devices coupled one each to the mechanical output member of said servos thereby to display the phase of each of said first, second and third signals as measured with respect to the phase of said frequency standard signal when said switching means is in said first position thereby enabling circular navigation, and to display the phase of said second and third signals as measured with respect to the phase of said first signal when said switching means is in said second position thereby enabling hyperbolic navigation.

3. The system of claim 2 wherein the mechanical output member of the servo associated with said first phase shifter is connected to its respective readout device by means of a disengageable coupling device.

4. The system of claim 3 including at least two relays operatively associated with each of said servo devices and said phase shifters to enable the sequential operation of said servo devices and said phase shifters.

References Cited

UNITED STATES PATENTS 2,709,807   5/1955   Strong _____ 343—105 X
2,811,716   10/1957  Crist.

RUDOLPH V. ROLINEC, *Primary Examiner.*

P. F. WILLE, *Assistant Examiner.*

U.S. Cl. X.R.

343—105